United States Patent [19]

Dillon

[11] Patent Number: 5,511,079
[45] Date of Patent: Apr. 23, 1996

[54] APPARATUS AND METHOD FOR CONTROLLING FORWARD ERROR CORRECTION ENCODING IN A VERY SMALL APERTURE TERMINAL

[75] Inventor: Douglas Dillon, Gaithersberg, Md.

[73] Assignee: Hughes Aircraft Company, Los Angeles, Calif.

[21] Appl. No.: 67,765

[22] Filed: May 26, 1993

[51] Int. Cl.⁶ .......................... G06F 11/10; H03M 13/00
[52] U.S. Cl. .............................................. 371/43; 371/41
[58] Field of Search .................. 371/43, 5.5, 41, 371/5.1, 32; 370/95.3

[56] References Cited

U.S. PATENT DOCUMENTS

| | | | |
|---|---|---|---|
| 3,824,547 | 7/1974 | Green et al. | 371/32 |
| 4,047,151 | 9/1977 | Rydbeck et al. | 340/146.1 |
| 4,309,764 | 1/1982 | Acampora | 370/95.3 |
| 4,744,083 | 5/1988 | O'Neill et al. | 371/5.1 |
| 4,756,007 | 7/1988 | Qureshi et al. | 375/37 |
| 4,980,897 | 12/1990 | Decker et al. | 371/43 |
| 5,128,965 | 7/1992 | Henriksson | 375/58 |

OTHER PUBLICATIONS

Stüber, Gordon L. "An Adaptive Rate Algorithm for FH/BFSK Signaling." IEEE Transactions on Communications, vol. 36, No. 12, Dec. '88 p. 1269.

Chase, David "Code Combining– . . . Noisy Packets" IEEE Transactions on Communications, vol. Com–33, No. 5, May 1985.

Primary Examiner—Roy N. Envall, Jr.
Assistant Examiner—Thomas E. Brown
Attorney, Agent, or Firm—Gordon R. Lindeen, III; Wanda K. Denson-Low

[57] ABSTRACT

A system for controlling forward error correction of a VSAT earth station is disclosed. A hub earth station communicating with the VSAT earth station transmits digital data representing a propagation condition measured at the hub earth station. The VSAT earth station computes an estimated inroute fade from the transmitted information, as well as from the VSAT demodulator's estimate of propagation condition. When the total inroute fade is below a selected margin, a higher FEC encoding rate is selected for the VSAT transmitter in which to transmit its data packets to the hub earth station. As the estimated inroute fade exceeds a high FEC rain margin, a lower rate of FEC encoding is employed at the VSAT earth station. By permitting a higher FEC encoding rate, digital throughput is increased between the VSAT earth station and the hub station.

13 Claims, 2 Drawing Sheets

APPARATUS AND METHOD FOR CONTROLLING FORWARD ERROR CORRECTION ENCODING IN A VERY SMALL APERTURE TERMINAL

The present invention relates to very small aperture terminal VSAT satellite communication systems. Specifically, a method and apparatus are provided which will increase the throughput of data transmissions from a remote VSAT station to a central hub earth station.

In the typical VSAT communication system, a large earth station known as the hub broadcasts a continuous carrier to hundreds or thousands of smaller VSAT earth stations via a satellite transponder. The hub station outbound carrier signal contains packets of digital data addressed to the individual VSAT stations of the system. Communication in these systems is two-way, and the smaller VSAT stations typically generate transmission bursts on an inbound carrier signal via the satellite transponder back to the hub earth station. The plurality of VSAT stations typically share one or more carriers, using multiple access techniques, such as slotted aloha and time division multiple access TDMA multiplexing to forward their data packets to the earth station.

The typical VSAT system operates over a wide range of propagation conditions. Weather conditions produce rain fades, producing a possible loss of data packets transmitted over the inbound or outbound carrier signals.

The packet loss suffered by VSAT transmissions over the inbound carrier signal is reduced by using forward error correction (FEC) encoding. In the presence of rain fades, the digital packets may be encoded at ½ FEC to permit the hub station some error correction facility in light of a partial loss of a packet due to random bit errors. However, the use of the forward error correction technique reduces the data packet throughput from VSAT to the hub earth station as additional bandwidth is used to send the error correcting bits along with the packet bits.

The hub earth station, on the other hand, is able to monitor the quality of its own signal by receiving an echo of its own transmission to the transponder. Adverse weather conditions will be represented in the quality of the received echoed signal, and adjustments can be made in uplink power, increasing the outbound signal carrier signal level. Thus, the fading problem and potential loss of signal packets is avoided by the increase in transmission power.

The remote VSAT stations typically do not have the capability of receiving their own transmission. The VSAT earth stations operate at a fixed FEC encoding level to be certain that under either clear sky conditions or with a rain margin, the bit error rate received at the hub earth station is within acceptable levels.

A penalty is incurred by operating the VSAT FEC encoding at a constant rate as a loss in transmission rate. In a system which can employ 256 kilosymbols per second, as a data rate for the inroute signal, the VSAT would transmit at ½ FEC all the time, for a resulting transmission bit rate of 128 kilobits per second KBTS, regardless of the propagation conditions. In a clear sky condition, this unneeded error correction rate severely limits the systems' data throughput.

The present invention is directed to addressing the problem of controlling error correction encoding to avoid the consequences of a constant FEC encoding rate under all propagation conditions.

SUMMARY OF THE INVENTION

It is an object of this invention to provide for variable forward error correction rate encoding of a digital data signal as a function of propagation conditions.

It is a more specific object of this invention to permit a VSAT earth station terminal to increase its data throughput by changing the forward error correction encoding rate in accordance with propagation conditions.

These and other objects of the invention are provided in a system for communication between a hub earth station and a plurality of VSAT earth stations, via a satellite transponder. The hub facility includes a transmitter for generating an outbound carrier frequency signal modulated with a stream of digital data packets addressed to each of the plurality of VSAT earth stations. The hub earth station can adjust its power level in accordance with locally-detected propagation conditions. These conditions are determined by the hub earth station from monitoring its own signal as transmitted from the satellite transponder. When the monitored signal to noise ratio is below a threshold level, the hub station increases its transmit power.

The hub earth station also generates a digital data packet representing the power level setting for insertion on an outbound carrier signal. The packet is an indication of the local propagation conditions detected by the hub earth station and is transmitted on a periodic basis to each of the VSAT terminals.

The VSAT terminals can decode the packet identifying propagation conditions at the hub, and make decisions about the level of forward error correction (FEC) which is to be applied to its data packets which are transmitted from the VSAT terminal via an inbound carrier signal to the satellite transponder, and then to the hub earth station. By knowing conditions at the hub, it is possible to estimate at the VSAT earth station inroute fade, and control the forward error correction necessary to insure a given bit error rate at the hub earth station for the inbound traffic.

In accordance with a preferred embodiment, the VSAT earth station will estimate the inroute fade from the packet transmitted from the hub earth station, and the signal to noise ratio of received outroute carrier signals, with respect to the signal to noise ratio of an outbound carrier signal which is received during optimum clear sky conditions.

From this data and signal to noise condition, the VSAT can set a forward error correction rate which is representative of the inroute fade. By adjusting the forward error correction rate at the VSAT terminal, bandwidth and throughput are not compromised when propagation conditions are detected to be approaching clear sky circumstances, and forward error correction can be increased during those circumstances when rain fades are being experienced, either at the hub earth station or at the VSAT earth station location.

DESCRIPTION OF THE PREFERRED EMBODIMENT

Figure 1:
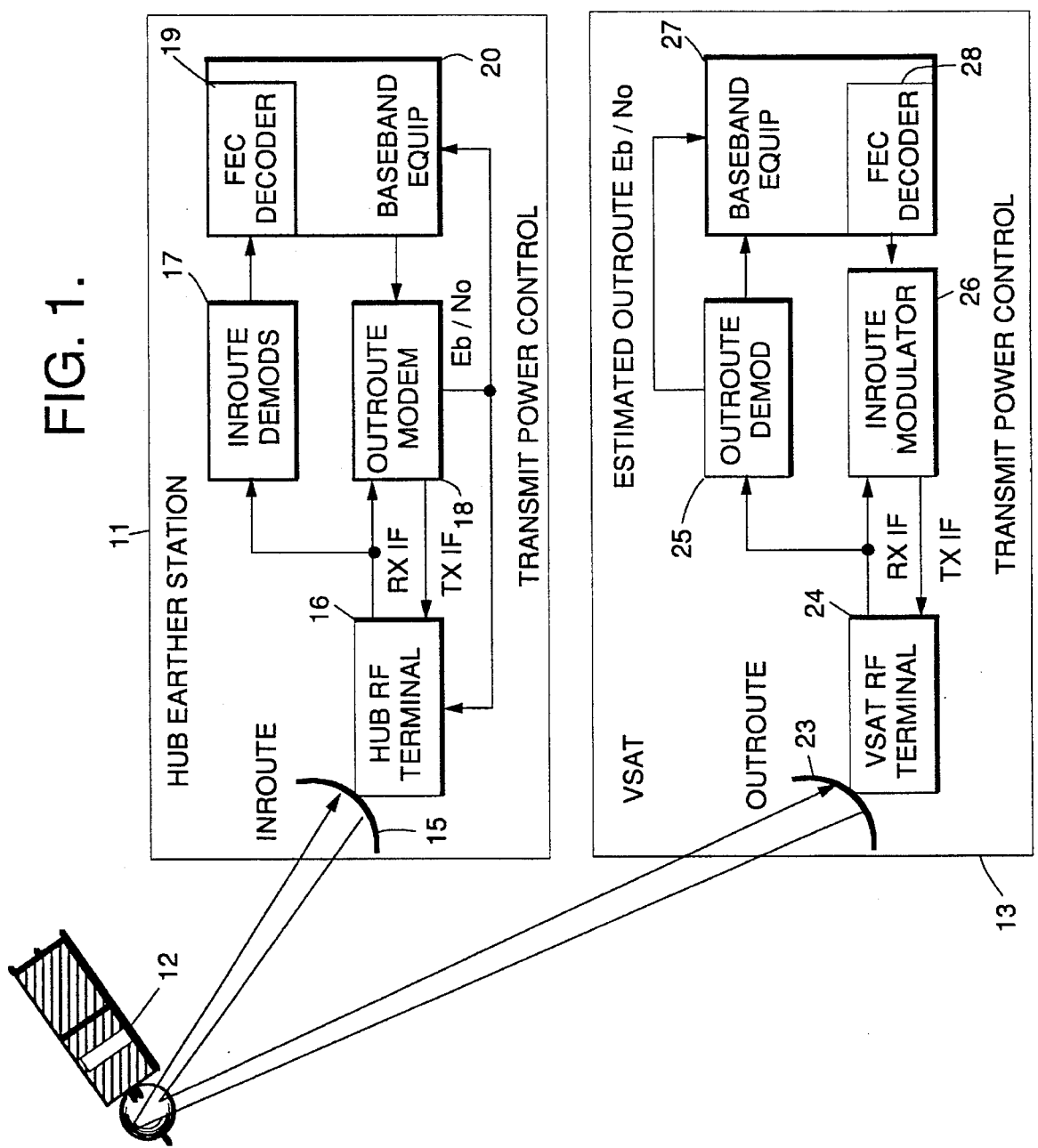
FIG. 1 is a system block diagram showing the hub earth station satellite transponder and VSAT earth station communication system in accordance with a preferred embodiment of the invention.

Referring now to FIG. 1, there is shown a VSAT telecommunications system having a hub earth station 11 which communicates via a satellite transponder 12 to a VSAT earth station terminal 13. In the typical VSAT system, there are hundreds and perhaps thousands of VSAT terminals 13 which communicate with respect to a single hub earth station 11. The communication path from the hub earth station 11, via the satellite transponder 12, to the plurality of VSAT terminals 13, is over an outroute radio frequency carrier signal, generated at the hub earth station 11. Packets of digital data, addressed to one or more of the VSAT terminals 13, are modulated on the outroute carrier signal for transmission to the VSAT earth stations 13.

The outroute carrier signal is generated by the hub radio frequency (RF) terminal 16. A continuous carrier signal which may be in the Ku band frequency range is transmitted as an uplink signal to the satellite transponder 12. The hub RF terminal 16 also receives inbound data traffic over a carrier signal burst initiated as the outroute carrier by the VSAT terminal 13. The received signal from the hub RF terminal 16 is converted to an intermediate frequency (IF) signal which is applied to both the inroute demodulator 17 as well as the outroute modem 18. Data packets contained on the inroute carrier burst are demodulated by the inroute demodulator 17 and applied to the FEC decoder 19, which is a part of the hub earth station baseband signal processor.

Packets which originate at the hub earth station are supplied by the baseband processor 20 to the outroute modem 18. The outroute modem creates an IF signal containing the serialized packets, all of which are addressed to a given VSAT terminal in the system.

The IF signal also contains an echo signal from transponder 12 which is also applied to the outroute modem 18 to permit a determination of the relative propagation conditions existing at the hub earth station. By determining the signal to noise ratio of the IF signal, representing an echo signal from transponder 12, it is possible to determine whether or not significant rain fades are being incurred by the outroute carrier signal. The detected signal to noise ratio, indicated as the quantity $E_b/N_o$(i.e. energy per bit/noise power per hertz), is used to control the transmit power level for the hub RF terminal 16.

The baseband processor 20 will encode into a digital packet the transmit power control, thus representing a level of the signal to noise ratio $E_b/N_o$ for the hub earth station carrier signal. The packet identifies the power level of transmission representing propagation conditions at the hub earth station.

The outroute modem inserts the packet to the serial data stream being modulated onto the outbound carrier signal. Thus, each remote earth station can determine the propagation conditions existing at the hub earth station.

The VSAT earth stations tend to have lower carrier signal power, and have a smaller apertured antenna 23. The VSAT RF terminal 24 provides a receive IF signal for the inroute modulator 26.

The outroute demodulator 25 produces a signal representing the current $E_b/N_o$ for the VSAT earth station 13. The estimated outroute $E_b/N_o$ is an indication of the estimated outroute fade which occurs at the VSAT earth station 13.

Data packets for delivery over the inroute carrier signal from the RF terminal 24 to the hub earth station 11 via the satellite transponder 12 are prepared in the baseband processor 27. The data packets are encoded by the FEC encoder 28. As is known in error correction technology, it is possible to add to each data packet the number of additional bits which will permit the reliable decoding and error correction of the data packets at the receiving hub earth station FEC decoder 19. The encoded packets are applied to the inroute modulator 26, where they are inserted in a TDMA frame for modulating the inroute carrier signal produced by the VSAT RF terminal 24.

In employing the forward error correction FEC encoder 28, error correction is accomplished at a rate which will permit a predetermined bit error rate to be achieved at the receiving hub earth station for a given received signal level. Under clear sky conditions, the power level of the VSAT inroute carrier signal is set so that the hub earth station demodulator 17 operates at an $E_b/N_o$ which can sustain a rain margin fade, i.e, an amount which decreases the received signal $E_b/N_o$ from a clear sky condition. Thus, if the $E_b/N_o$ for the hub station demodulator is 5.7 dB, and the rain margin is 5.0 dB, the outroute carrier signal level is set to produce a 10.7 dB $E_b/N_o$ at the hub receiver. Using FEC encoding of ½ at the VSAT earth station will produce an error rate of one error in 101 bits in the presence of a 5 dB rain margin.

As weather-induced fading decreases from the 5 dB margin, the signal at the hub earth station increases beyond a point where the bit error rate (BER) rate is sustainable without FEC encoding the signal at a rate of ½.

Table A below demonstrates how sequentially encoded quadrature phase shift keying (QPSK) modulation, using FEC rates of ½ and ⅞, produce the same error rate threshold of one error in 101 bits when the rain margin is reduced from 5 dB to 3.1 dB. The hub demodulating signal increases to 7.6 dB $E_b/N_o$, and ⅞ sequential FEC encoding may therefore be used to obtain the same BER at the hub.

TABLE A

| LINK PARAMETERS FOR SEQUENTIAL ENCODED QPSK INROUTE MODULATION | | |
|---|---|---|
| | Rate 1/2 | Rate 7/8 |
| Bit Error Rate Threshold | 1 Error in 10 bits | Same |
| Hub Demod Operating Point | 5.7 dB Eb/No | 7.6 dB Eb/No |
| Rain Margin | 5 dB | 3.1 dB |
| Clear Sky Eb/No | 10.7 Eb/No | 10.7 Eb/No |

In the presence of rain, wherein rain fades are observed, a rain margin is shown of 5 dB. This means that the hub demodulator must operate in a signal to noise environment of 5.7 dB $E_b/N_o$. In so doing, the error correction rate must be improved and the FEC rate is shown to be ½.

It is clear that if the data packets are transmitted from the VSAT earth station at 256 kilosymbols per second, the ½ FEC rate will reduce the transmit bit rate to 128 KBPS. However, under favorable propagation conditions, it may be possible to increase the forward error correction rate to ⅞, thus providing a data throughput of 224 KBPS.

The present invention makes use of the ability to decrease the forward error correction rate when unfavorable weather conditions occur which require the lower FEC rate. When the estimated inroute fade is less than 3.1 dB, the more favorable FEC encoding rate of ⅞ is utilized. In the face of an inroute fading exceeding 3 dB, the lower ½ FEC encoding rate will be implemented.

Inroute fade, i.e., the rain margin, is estimated as follows:

estimated inroute fade = estimated outroute fade =
clear sky outroute $E_b/N_o$ − estimated outroute $E_b/N_o$ −
transmit power control outroute adjustment.

The clear sky outroute $E_b/N_o$ is the signal to noise ratio that the VSAT experiences when weather conditions are good at both the hub earth station and the VSAT and can be measured or calculated based on the satellite footprint and the size of the VSAT antenna at the time of installation.

The estimated outroute $E_b/N_o$ is the VSAT demodulator's estimate of the signal to noise ratio of a currently received outroute carrier signal. Estimations of signal to noise ratio can be made by looking at the automatic gain control (AGC) control of the outroute demodulator and using that as an estimate of signal conditions being experienced at the VSAT earth station.

The transmit power control level which is transmitted via a digital data packet to the VSAT earth station provides an indication of the propagation conditions at the hub earth station.

Allowing for some inaccuracy in the inroute fade estimation (e.g., a worst case fade estimation error of 1 dB), the VSAT operates with the higher FEC encoding rate whenever the estimated inroute fade is less than the higher FEC rain margin, minus any worst case fade estimation error. This can be expressed as follows:

Estimated inroute fade<higher FEC rain margin−worst case fade estimate error.

Thus, in those circumstances where the estimated inroute fade decreases to 3.1 dB, it is possible to downshift the FEC encoding rate of ⅞, thereby obtaining the higher throughput from VSAT earth station to hub earth station. This will also maintain the bit error rate detected at the hub earth station when both high and low inroute fades are being estimated.

Figure 2:
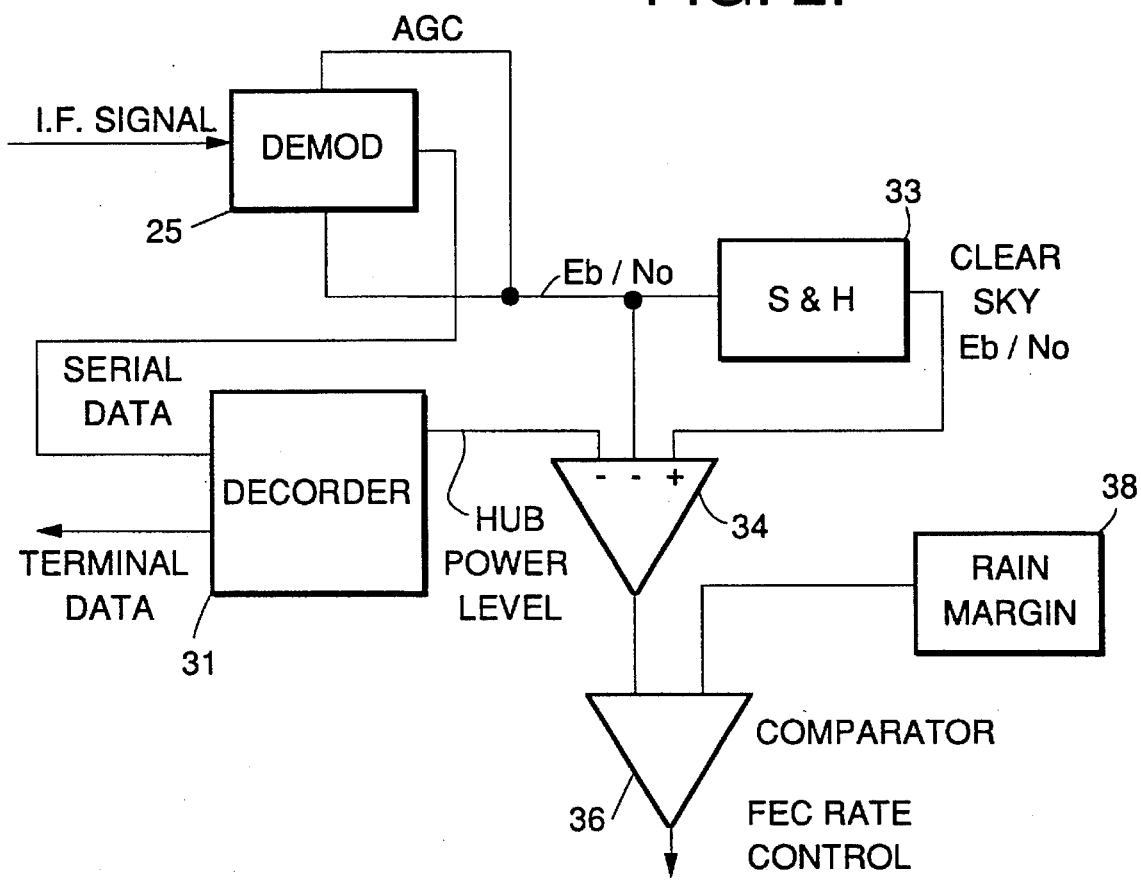
FIG. 2 illustrates circuitry for shifting the FEC encoding rate from ⅞ to ½.

Referring to FIG. 2, there is shown circuitry in the baseband processor 20 which will make decisions as to the level of FEC encoding which is appropriate for the estimated inroute fade. The demodulator 25 provides, as an AGC level, an indication of the Eb/No of a received IF signal. During clear sky conditions during an initial system setup, the clear sky Eb/No is stored by a sample and hold circuit 33, and used as one input to a combining circuit 34.

The hub power level is derived from decoder 31 which decodes the packet which was forwarded from the hub earth station, and constitutes another input of the combining circuit 34. Combining circuit 34 combines the hub power level, received Eb/No and clear sky Eb/No to determine the inroute fade.

A comparator 36 compares the inroute fade with respect to a prestored rain margin (which includes a worse case estimate error) from reference generator 38. When the inroute fade exceeds the rain margin, the FEC decoding rate is shifted from ⅞ to ½. As the inroute fade decreases, comparator 36 will provide a signal for shifting the FEC encoding rate from ½ back to ⅞, thus providing a higher data throughput for the VSAT station.

Thus, there has been shown a technique for permitting variable FEC encoding rates, depending on the propagation conditions existing between two satellite-linked earth stations. Those skilled in the art will recognize yet other embodiments described more particularly by the claims which follow.

What is claimed is:

1. A method for adjusting the forward error encoding rate of a VSAT each station digital data transmission comprising:
   measuring at a hub station the level of an echo signal produced in response to a transmission from said hub station to a satellite transponder;
   determining from said level an indication of propagation conditions;
   transmitting a signal from said hub station to a plurality of VSAT earth stations, said signal comprising said indication of propagation conditions; and
   altering the forward error correction rate (FEC) of said VSAT earth station transmission in accordance with said indication of propagation conditions such that the bit error rate for said VSAT earth station transmissions is maintained below a predefined value.

2. The method for adjusting the forward error encoding rate of claim 1, wherein said indication of propagation conditions comprises a power level setting of said signal transmitted by said hub station.

3. The method according to claim 1, wherein said indication comprises an encoded value of a signal to noise ratio of a signal received at said hub station.

4. A system for controlling the forward error correcting rate of a VSAT comprising:
   a hub earth station having an outroute transmitter for forwarding digital data modulated on an outroute carrier signal;
   a transmit power control for changing the level of power being transmitted by said hub earth station;
   an encoder means for generating from said level a data packet representing said level and for combining said packet with said digital data;
   a VSAT earth station for receiving said outroute carrier signal;
   a demodulator at said VSAT earth station for removing said packet from said digital data;
   an inroute transmitter for forwarding digital data from said VSAT earth station to said hub station over an inroute carrier;
   a forward error correcting encoder for encoding said VSAT digital data at multiple rates selectable by a control signal; and
   means for supplying said control signal to said forward error correcting encoder based on said data packet.

5. The system according to claim 4, wherein said hub station transmit power control changes said power level in accordance with an estimate of said outroute carrier signal to noise ratio.

6. The system according to claim 4 further comprising means for measuring the signal to noise ratio of said outroute carrier signal after said outroute carrier signal has been echoed back to said hub earth station by a satellite transponder.

7. The system according to claim 4, wherein said forward error correcting encoder provides a first or second FEC encoding rate in response to said control signal.

8. The system according to claim 7, wherein said first and second rates correspond to ½ FEC and ⅞ FEC encoding rates.

9. The system according to claim 7, wherein said means for supplying said control signal estimates a signal fade based on said packet contents and a locally determined signal to noise ratio of said received outroute carrier signal.

10. A VSAT earth station having an FEC encoding rate which varies in accordance with propagation conditions comprising:
   a radio frequency converter for providing an IF signal from a received outroute signal transmitted by a hub earth station via a satellite transponder, and providing an inroute radio frequency carrier signal for transmitting a data signal to said hub earth station;
   an outroute IF signal demodulator connected to receive said IF signal and to remove digital data packets contained in said IF signal;
   a baseband signal processor connected to receive said digital data packet from said outroute IF signal demodulator and to produce inroute digital data packets for transmission to said hub station;

an FEC encoder for encoding said inroute digital data packets at a selectable FEC rate;

means for estimating propagation conditions and supplying a signal for selecting said FEC rate based on said propagation conditions; and an inroute modulator for receiving said encoded inroute digital data packets and modulating said inroute radio frequency carrier with said encoded inroute digital data packets.

11. The VSAT earth station of claim 10 wherein said FEC encoder encodes said digital data packets at one of first or second FEC rate depending on said estimated propagation conditions.

12. The VSAT earth station of claim 10, wherein said encoder selects said FEC rate based on the contents of a data packet transmitted from said hub earth station and on estimates of the signal to noise ratio of said outroute signal.

13. The VSAT earth station of claim 11, wherein said means for estimating selects one of said FEC encoding rates based on the signal to noise ratio of said outroute signal under clear sky conditions, a presently determined signal to noise ratio of said outroute signal, and a packet received from said hub earth station representing said propagation conditions at said hub earth station.

\* \* \* \* \*